United States Patent [19]

Mabuchi et al.

[11] 3,957,540
[45] May 18, 1976

[54] BATTERY CASSETTE HOLDER

[75] Inventors: Kenichi Mabuchi; Tetsuo Ogita, both of Tokyo, Japan

[73] Assignee: Mabuchi Motor Co., Ltd., Tokyo, Japan

[22] Filed: Dec. 8, 1971

[21] Appl. No.: 205,868

[52] U.S. Cl. .............................. 136/173; 339/152; 339/119 R
[51] Int. Cl. ........................................ H01m 1/04
[58] Field of Search ............ 136/173; 339/152, 119, 339/75; 307/149

[56] References Cited
UNITED STATES PATENTS

| | | | |
|---|---|---|---|
| 3,535,996 | 10/1970 | Winkler | 136/173 |
| 3,742,832 | 7/1973 | Stoneham et al. | 136/173 |

Primary Examiner—Winston A. Douglas
Assistant Examiner—H. A. Feelex
Attorney, Agent, or Firm—H. J. Staas; James D. Halsey, Jr.

[57] ABSTRACT

A holder for a battery cassette which has, at its front portion, a pair of terminals of dry cells juxtaposed therein and, at its rear portion, a releasable lid which defines a projecting flange in cooperation with the rear edge of the battery cassette. The battery cassette holder has a window in the base board thereof through which the battery cassette is mounted on said holder, a terminal mounting board provided with a pair of resilient terminals for making resilient contact with said terminals of the battery cassette and a fixing board provided with a notch for receiving the upper side of said projecting flange when the battery casette is mounted in position, thereby to snugly and rigidly hold the battery cassette.

2 Claims, 5 Drawing Figures

INVENTOR

BY

ATTORNEY

BATTERY CASSETTE HOLDER

The present invention relates to a battery cassette holder and more particularly to a battery cassette holder suitable for use with a model plane and other various model machines such as a model ship a model car or the like using a miniature electric motor or an electro-magnet.

It is an object of the present invention to provide a battery cassette holder which permits easy and rapid mounting and removal of the battery cassette.

It is another object of the present invention to provide a battery cassette holder which can positively hold the battery cassette in its holding position, preventing a possible dropping of the battery cassette due to vibration or impact and eliminating possible movement or displacement of the battery cassette.

It is a further object of the present invention to provide a battery cassette holder having a window or an opening for mounting the battery cassette therethrough, which enables the weight of the battery cassette holder to be reduced, and suitable for a model plane which requires to be light in weight.

It is a still further object of the present invention to provide a cassette holder in which a plurality of openings for heat radiation are provided in the battery cassette to effect heat exchange in cooperation with the above-mentioned window.

According to the present invention, there is provided a combination of a battery cassette having, at its front portion, terminals for the anode and the cathode of dry cells juxtaposed therein and, at its rear portion, a releasably fitted lid having a connecting board for connecting said anode and said cathode of the dry cells, said lid defining a projecting flange at the rear portion of the battery cassette when the lid is fitted to the battery cassette; and a holder having a window for permitting the insertion of the battery cassette therethrough, a base board provided with a projecting for on which the terminals of the battery cassette rest, a terminal mounting board provided with a pair of resilient terminals for making contact with the terminals of the battery cassette and a fixing board having a notch for engagement with an upper side of said projecting flange of the battery cassette.

The present invention will be better understood from the following description taken in connection with the accompanying drawing in which.

Figure 1:
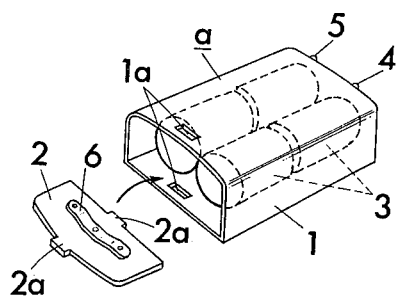
FIG. 1 is a perspective view of a battery cassette.
Figure 2:
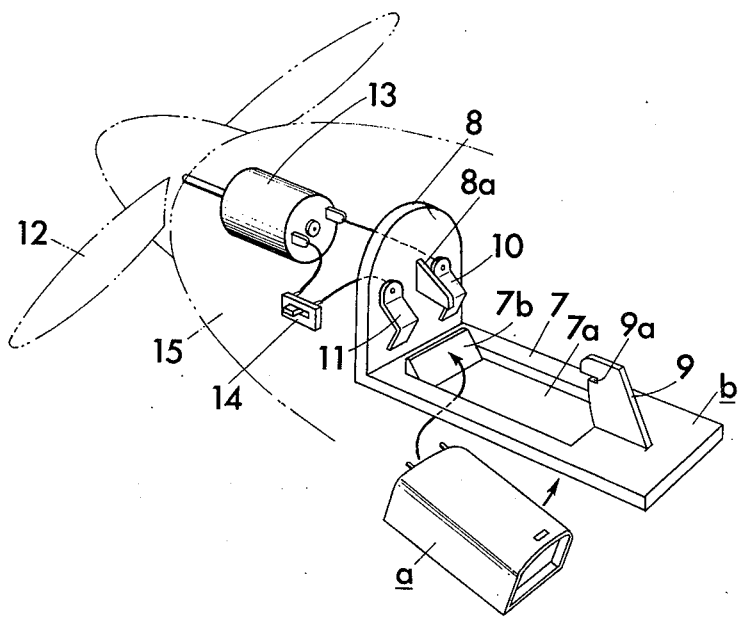
FIG. 2 is a perspective view of a battery cassette holder.

Referring to the drawing, there is illustrated one form of the battery cassette holder embodying the present invention. The reference character *a* represents a battery cassette which comprises a casing 1 and a lid 2. Both may be made of a vinyl chloride, polypropylene or any other suitable plastics.

Within the casing 1, dry cells 3, which may be primary (non-rechargeable) dry cells or secondary (rechargeable) dry, cells, are juxtaposed in pairs. One pair is connected in tandem with another in such a way that the dry cells in one row are arranged in one sense while the dry cells in the other row are arranged in the opposite sense. Although not shown in the drawing, the front portion of the casing 1 has separate terminal pins for making contact with the anode of the dry cell in one row located in the first position and the cathode of the dry cell in the other row located in the first position. Terminals 4 and 5 to be connected with said terminal pins, respectively, are formed to protrude from the casing 1.

Secured on the back face of the lid 2 is a connecting plate 6 which serves to interconnect the cathode of the last dry cell of said one row and the anode of the last dry cell of the other row. The lid 2 is provided with projections 2*a* on its upper and lower edges, which projections are adapted to be detachably fitted into openings 1*a* formed at upper and lower portions of the casing 1 in the rear portion thereof. The openings 1*a* are positioned so that when the lid 2 is fitted in position of the casing 1, the lid 2 slightly stands forward from the rear edge of the casing 1 to define a flange. With such a flange, the casing 1 can be hooked by a finger tip or a nail.

The reference character *b* represents a holder which may be made of plastic materials as in the case of said battery cassette. The holder *b* generally comprises a base board 7, a terminal mounting board 8 and a fixing board 9. The terminal mounting board 8 is integrally fixed to the front portion of the base board 7 while the fixing board 9 is integrally fixed to the rear portion of the base board 7.

Provided on the terminal mounting board 8 are elastic terminals 10 and 11, between which there is formed a stop element 8*a*. At a front portion of the fixing board 9 a notch 9*a* for receiving and fixing the casing 1 is formed. On the base board 7 is formed a window 7*a*. At the front portion of the window 7*a* there is provided a projecting bar 7

The reference numeral 15 represents a body of a model plane, 12 a propeller, 13 a miniature motor and 14 a switch.

Figure 3:
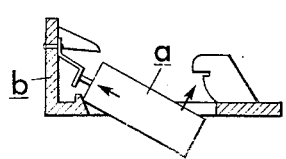
FIG. 3 is a side elevational view illustrating the manner for mounting the battery cassette on the holder.
Figure 4:
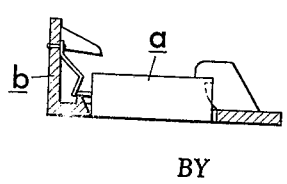
FIG. 4 is a side elevational view of the battery cassette mounted in position on the holder.
Figure 5:
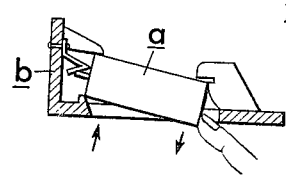
FIG. 5 is a side elevational view illustrating the manner for detaching the battery cassette.

With the arrangement described above, the battery cassette *a* housing the dry cells 3 therein is inserted slantingly upwardly through the window 7*a* of rest holder *b* as shown in FIG. 3, keeping the terminals 4 and 5 in front position. The rear portion of the battery cassette *a* is then pushed in the direction of an arrow shown in FIG. 3, while pressing the terminals 4 and 5 in the direction shown by another arrow of FIG. 3 to urge the terminals 4 and 5 against the resilient terminals 10 and 11. In this manner, the tip ends of the terminals 4 and 5 are resiliently contacted with the terminals 10 and 11 while the terminals 4 and 5 rest on the protruding bar 7*b*, and the upper side of the rear flange is fitted in the notch 9*a* of the fixing board 9 for positive holding of said battery cassette (See FIG. 4). Namely, the terminals 4 and 5 of the battery cassette are rigidly held in place by the projecting bar 7*b* and the resilient restoring force of the terminals 10 and 11, and the upper side of the rear flange is fitted in and supported by the notch 9*a* of the fixing board 9. Accordingly, the battery cassette thus held does not fall off accidentally and is not stirred by vibration or impact, assuring positive maintenance of correct electrical connection. When it is required to detach the battery cassette, as shown in FIG. 5, the rear flange of the battery cassette is hooked up by a nail or a finger tip and pushed forward slightly. Thus the battery cassette can easily be detached.

According to necessity, the battery cassette may be provided with a number of holes for heat radiation which effect heat exchange in cooperation with the above-mentioned window 7a. In case secondary dry cells are employed, two such battery cassettes are preferably provided. One of the cassette may be used for operation and the other is used for charging.

Thus it will be apparent that the objects as set forth hereinabove are accomplished by the present invention.

The reference to Japanese patent application No. 106019/70 will be appreciated, the invention of which is an essential basis of a series of our investigations with respect to a model plane to which series of our investigations the present invention belongs.

What is claimed is:

1. A combination of a battery cassette having, at its front portion, terminals for the anode and the cathode of dry cells juxtaposed therein and, at its rear portion, a releasably fitted lid having a connecting board for connecting said anode and said cathode of the dry cells, said lid defining a projecting flange on the rear portion of the battery cassette when the lid is fitted to the battery cassette; and a holder having a window for permitting the insertion of the battery cassette therethrough, a base board provided with a projecting bar on which the terminals of the battery cassette rest, a terminal mounting board provided with a pair of resilient terminals for making contact with the terminals of the battery cassette and a fixing board having a notch for engagement with an upper side of said projecting flange of the battery cassette.

2. A combination as claimed in claim 1, wherein said battery cassette has a plurality of holes for heat radiation which effects heat exchange in cooperation with the window for permitting the insertion of the battery cassette therethrough.

* * * * *

UNITED STATES PATENT OFFICE
CERTIFICATE OF CORRECTION

Patent No. 3,957,540           Dated May 18, 1976

Inventor(s) Kenichi Mabuchi

It is certified that error appears in the above-identified patent and that said Letters Patent are hereby corrected as shown below:

On the cover sheet, the following should be added:

--(30) Foreign Application Priority Data
    December 8, 1970   Japan 45-121678 --.

Signed and Sealed this

Second Day of November 1976

[SEAL]

Attest:

RUTH C. MASON
*Attesting Officer*

C. MARSHALL DANN
*Commissioner of Patents and Trademarks*